United States Patent Office 3,047,539
Patented July 31, 1962

3,047,539
PRODUCTION OF POLYESTERS
Brian W. Pengilly, Stow, Ohio, assignor to The Goodyear Tire & Rubber Company, Akron, Ohio, a corporation of Ohio
No Drawing. Filed Nov. 28, 1958, Ser. No. 776,758
11 Claims. (Cl. 260—75)

This invention relates to the preparation of polymeric glycol esters of terephthalic and isophthalic acids. More particularly, this invention relates to an improvement in the method of preparing such superpolyesters by the alcoholysis of esters of these phthalic acids with a glycol and the subsequent polymerization of the glycol phthalates to high polymeric linear polyesters.

In the preparation of linear superpolyesters, one of the most satisfactory methods from the standpoint of simplicity of reaction and economy of operation has been the ester interchange method in which the esters of the acids are reacted with a glycol to form the diglycol ester of the acid or a low molecular weight polymeric polyester which is then polymerized to a high molecular weight polymeric polyester by a condensation reaction with splitting out of glycol. The process thus comprises two steps. In the first, the alcoholysis reaction between the esters of the dicarboxylic acids and the glycol forms the bis glycol esters. The second step is the polymerization or condensation step in which the bis glycol esters are condensed, glycol is eliminated and high molecular weight polymer is formed. This process, however, has not been entirely satisfactory because the initial ester interchange reaction is slow and because many of the materials that catalyze this reaction are not effective as catalysts for the subsequent condensation reaction.

Heretofore various materials have been proposed as catalysts for the ester interchange reaction between the esters of dicarboxylic acids and glycols and for the subsequent polymerization or condensation reaction. Metals in the form of powder, chips, ribbon or wire, and materials having a large surface area such as powdered glass and silica gel have been suggested as catalysts. The more successful of the catalysts used in the past, however, have been the alkaline materials such as the alkali metal and alkaline earth metal alcoholates, the alkali metal carbonates, or other alkaline reacting salts, alkaline earth oxides, and litharge.

Many of these materials are effective catalysts for the initial simple ester interchange, and some of them catalyze the condensation reaction. However, many of the substances that catalyze the condensation reaction carry the polymerization only to a low degree or they do not promote the reaction effectively enough to give reaction rates acceptable for a commercial process.

According to the present invention antimony compounds of the general formula

in which $R_1$ is a radical selected from the group consisting of hydrogen, alkyl, aralkyl, aryl and alkaryl groups and $R_2$ and $R_3$ are the same or different radicals selected from the group consisting of alkyl aralkyl, aryl and alkaryl accelerate the polymerization of bis glycol esters or low polymers thereof and permit the formation in relatively short reaction times of linear polyesters of high molecular weight which may be readily processed to form products having excellent properties.

The following examples illustrate the invention and show how it may be carried out.

Example 1

One thousand grams of dimethyl terephthalate, 750 milliliters of ethylene glycol and 0.5 gram of manganous acetate were put into a two-liter flask equipped with a stirrer, nitrogen inlet tube and Claisen head. The mixture was heated until the vapor temperature had risen to 190° C. and then for thirty minutes longer. During this time 555 milliliters of methanol were collected. The product was poured into a clean stainless steel dish. After solidifying, the product was broken up and stored in a dry bottle.

Example 2

Twenty-five grams of the product prepared in Example 1 were placed in a glass tube having an inside diameter of 25 millimeters and 0.008 gram of triphenyl antimony were added. The mixture was heated at 282° C. by means of a refluxing dimethyl phthalate vapor bath and the pressure was reduced to 1 millimeter of mercury pressure. Nitrogen gas was slowly bubbled through the reaction mixture. After 1½ hours of condensation under these conditions, a polymer of excellent color having a melting point of 259 to 260° C. was obtained. The polymer had an intrinsic viscosity of 0.484 (measured in 60/40 phenoltetrachloroethane mixture at 30.0° C.).

Example 3

Eighty-one pounds of dimethyl terephthalate, 54 pounds of dimethyl isophthalate, 86 pounds of ethylene glycol, 0.0405 pound of zinc acetate, 0.00688 pound of manganous acetate and 0.0675 pound of triphenyl antimony were placed in an autoclave and heated up to 230° C. The alcoholysis reaction was substantially complete in two hours. At the conclusion of the alcoholysis reaction the pressure was gradually reduced to 2.0 millimeters of mercury pressure and the glycol was distilled off. The reaction mixture was then heated at 270° C. and the pressure was reduced to 1 millimeter of mercury pressure. After 3¼ hours of condensation under these conditions a copolymer of excellent color having an intrinsic viscosity of 0.674 was obtained.

The practice of the invention has been illustrated with particular respect to the preparation of ethylene terephthalate and a 60/40 ethylene terephthalate-ethylene isophthalate copolyester. Polymeric ethylene isophthalate and copolyesters containing various ratios of ethylene terephthalate to ethylene isophthalate can similarly be made using antimony compounds of the invention as the condensation polymerization catalyst. The antimony compounds for the practice of the invention are compounds of the general formula

in which $R_1$ is a radical selected from the group consisting of hydrogen, alkyl, aralkyl, aryl and alkaryl and $R_2$ and $R_3$ are the same or different radicals selected from the group consisting of alkyl, aralkyl, aryl and alkaryl. Representative examples of alkyl radicals are methyl, ethyl, propyl, butyl, amyl, hexyl, octyl, decyl, undecyl, and dodecyl; representative examples of aralkyl radicals are benzyl and phenethyl; representative examples of aryl radicals are phenyl and naphthyl; representative examples of alkaryl radicals are tolyl and xylyl. Representative examples of antimony compounds of the invention are trimethyl antimony, triethyl antimony, tributyl antimony, triamyl antimony, tridecyl antimony, tridodecyl antimony dimethylethyl antimony, dimethylbutyl antimony, methyldiethyl antimony, methyldibutyl antimony, tribenzyl antimony, triphenyl antimony, tritolyl antimony, methyldiphenyl antimony, methylditolyl antimony, butyldiphenyl antimony, butylditolyl antimony, dimethlphenylantimony, dimethyltolyl antimony, benzyldiphenyl antimony, benzylditolyl antimony, dibenzylphenyl antimony, dibenzyltolyl antimony, dimethyl antimony hydride, dibutyl antimony hydride, dibenzyl antimony hydride, diphenyl antimony hydride, methylbenzyl antimony hydride, methylphenyl antimony hydride and methyltolyl antimony hydride.

The amount of the antimony compound used may be varied over wide concentrations. As is usual with catalysts, the amount will be relatively small. As a general rule, the amount will be within the range of from 0.003 to 0.10 percent based on the phthalate ester used. The preferred range is from 0.002 to 0.08 percent based on the phthalate ester used to give a satisfactory reaction rate and a product of suitable viscosity and color.

The antimony compound can be used as the sole catalyst for the condensation reaction. If desired, small amounts of other catalysts can be added to increase the rates of the condensation reaction to assist in obtaining a polyester of high viscosity in shorter reaction times.

In the practice of the invention, the preparation of the glycol ester and its subsequent polymerization is, in general, carried out in accordance with the usual, known techniques. Thus, the reaction is preferably carried out in the absence of oxygen, generally in an atmosphere of an inert gas such as nitrogen or the like, in order to lessen darkening and to make it possible to obtain a high molecular weight pale or colorless product. Bubbling the inert gas through the reacting mixture serves the added functions of agitation and of expediting the removal of volatile components formed by the reaction. The polymerization or condensation reaction is carried out under reduced pressure, generally below 10 millimeters of mercury pressure and usually at or below 1 millimeter of mercury pressure at a temperature in the range of from 260 to 290° C.

The examples illustrate the invention particularly with respect to the preparation of polyesters by starting with the dimethyl esters and ethylene glycol. The invention will also work effectively with other esters of the phthalic acids such as the ethyl, propyl, butyl, and phenyl esters. Glycols, such as the polymethylene glycols, for example the propylene glycols, the butylene glycols, and other glycols such as 1,4-cyclohexane dimethanol, 1,4-phenyl dimethanol and 2,2-bis[4-(beta hydroxyethyl)phenyl]propane can also be used although ethylene glycol is preferred because of its low cost and ready availability. The catalysts of the invention can also be used in condensation reactions of the type in which the glycol in a glycol diester of a dicarboxylic acid is displaced by a higher boiling glycol as illustrated by the reaction of bis(beta hydroxyethyl) terephthalate with 2,2-bis[4-(beta hydroxyethoxy)phenyl]propane to form copolymers containing the repeating units (A) 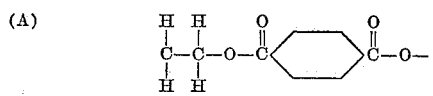

and (B) 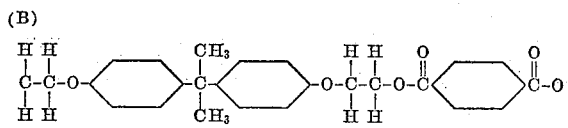

While certain representative embodiments and details have been shown for the purpose of illustrating the invention, it will be apparent to those skilled in this art that various changes and modifications may be made therein without departing from the spirit or scope of the invention.

I claim:

1. In a process for preparing a linear superpolyester by subjecting at least one bis ester selected from the group consisting of methyl, ethyl, propyl, butyl, and phenyl esters of an acid selected from the group consisting of terephthalic acid and isophthalic acid to alcoholysis in the presence of an excess of a glycol selected from the group consisting of polymethylene glycols containing from 2 to 4 methylene groups, 1,4-cyclohexane dimethanol and 1,4-phenyl dimethanol and thereafter subjecting the bis glycol ester thus formed to self condensation with the removal of the glycol, the improvement which comprises carrying out both the alcoholysis and condensation in the presence of a catalytic amount of an antimony compound of the general formula

in which $R_1$ is a radical selected from the group consisting of hydrogen, alkyl radicals containing from 1 to 12 carbon atoms, aralkyl, aryl and alkaryl and $R_2$ and $R_3$ are the same or different radicals selected from the group consisting of alkyl radicals containing from 1 to 12 carbon atoms, aralkyl, aryl, and alkaryl radicals.

2. In a process for preparing a linear superpolyester by the condensation, with the removal of glycol, of a bis ethylene glycol ester of at least one acid selected from the group consisting of terephthalic acid and isophthalic acid, the improvement which comprises carrying out the condensation reaction in the presence of a catalytic amount of triphenyl antimony.

3. In a process for preparing a linear superpolyester by the condensation with the removal of ethylene glycol of a bis ethylene glycol ester of at least one acid selected from the group consisting of terephthalic and isophthalic acids, the improvement which comprises carrying out said condensation in the presence of a catalytic amount of an antimony compound of the general formula

in which $R_1$ is a radical selected from the group consisting of hydrogen, alkyl radicals containing from 1 to 12 carbon atoms, aralkyl, aryl and alkaryl and $R_2$ and $R_3$ are the same or different radicals selected from the groups consisting of alkyl radicals containing from 1 to 12 carbon atoms, aralkyl, aryl and alkaryl radicals.

4. In a process for preparing a high molecular weight linear superpolyester by the self condensation, with the removal of glycol, of a low molecular weight polymeric ethylene glycol ester of at least one acid selected from the group consisting of terephthalic and isophthalic acids, the improvement which comprises carrying out said condensation in the presence of a catalytic amount of an antimony compound of the general formula

in which $R_1$ is a radical selected from the group consisting of hydrogen, alkyl radicals containing from 1 to 12 carbon atoms, aralkyl, aryl and alkaryl and $R_2$ and $R_3$ are the same or different radicals selected from the group consisting of alkyl radicals containing 1 to 12 carbon atoms, aralkyl, aryl and alkaryl radicals.

5. In the process of preparing a linear superpolyester by the condensation, with the removal of ethylene glycol, of a mixture of bis ethylene glycol terephthalate bis ethylene glycol isophthalate, the improvement which comprises carrying out said condensation in the presence of a catalytic amount of an antimony compound of the general formula

in which $R_1$ is a radical selected from the group consisting of hydrogen, alkyl radicals containing from 1 to 12 carbon atoms, aralkyl, aryl and alkaryl and $R_2$ and $R_3$ are the same or different radicals selected from the group consisting of alkyl radicals containing from 1 to 12 carbon atoms, aralkyl, aryl and alkaryl radicals.

6. A process according to claim 1 in which the bis ester used in the bis dimethyl ester.

7. A process according to claim 1 in which the antimony compound used in triphenyl antimony.

8. A process according to claim 1 in which the antimony compound used is in the amount of from .003 to 0.10% based on the bis ester used.

9. A process according to claim 5 in which the antimony compound used in triphenyl antimony.

10. In a process which comprises condensing bis hydroxyethyl terephthalate with a glycol having a higher boiling point than ethylene glycol, with the displacement of ethylene glycol from the bis hydroxyethyl terephthalate, to form a highly polymeric linear superpolyester, the improvement which comprises carrying out the condensation reaction in the presence of a catalytic amount of an antimony compound of the general formula

in which $R_1$ is a radical selected from the group consisting of hydrogen, alkyl radicals containing from 1 to 12 carbon atoms, aralkyl, aryl and alkaryl and $R_2$ and $R_3$ are the same or different radicals selected from the group consisting of alkyl radicals containing from 1 to 12 carbon atoms, aralkyl, aryl, and alkaryl radicals.

11. The process of claim 10 in which the antimony compound is triphenyl antimony.

References Cited in the file of this patent
UNITED STATES PATENTS
2,739,957     Billica _____ Mar. 27, 1956

UNITED STATES PATENT OFFICE
CERTIFICATE OF CORRECTION

Patent No. 3,047,539             July 31, 1962

Brian W. Pengilly

It is hereby certified that error appears in the above numbered patent requiring correction and that the said Letters Patent should read as corrected below.

Column 2, lines 52 to 55, the formula should appear as shown below instead of as in the patent:

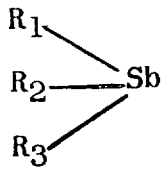

column 5, lines 8, 10 and 15, for "in", each occurrence, read -- is --.

(SEAL)          Signed and sealed this 21st day of May 1963.
Attest:

ERNEST W. SWIDER          DAVID L. LADD
Attesting Officer          Commissioner of Patents